United States Patent [19]

Hauff

[11] Patent Number: 4,703,136
[45] Date of Patent: Oct. 27, 1987

[54] SEALING BODY FOR FEEDTHROUGH FOR AT LEAST ONE CONDUCTING MEMBER THROUGH A WALL OPENING

[76] Inventor: Werner Hauff, Herlsbühlstr 19, 7925 Ballmertshofen, Fed. Rep. of Germany

[21] Appl. No.: 774,609

[22] PCT Filed: Mar. 28, 1985

[86] PCT No.: PCT/DE85/00093

§ 371 Date: Aug. 29, 1985

§ 102(e) Date: Aug. 29, 1985

[87] PCT Pub. No.: WO85/04461

PCT Pub. Date: Oct. 10, 1985

[30] Foreign Application Priority Data

Apr. 3, 1984 [DE] Fed. Rep. of Germany ....... 3412400

[51] Int. Cl.$^4$ .......................... F16L 5/02; H01B 17/30
[52] U.S. Cl. .................. 174/152 G; 174/156; 248/56; 277/70; 277/193; 277/199; 277/227
[58] Field of Search .............. 174/65 G, 151, 152 G, 174/153 G, 156; 16/2; 248/56; 277/12, 26, 70, 124, 190, 191, 192, 193, 198, 199, 215, 227; 285/159

[56] References Cited

U.S. PATENT DOCUMENTS

2,722,438  11/1955  Kennison ..................... 277/198
2,924,472  2/1960   Bush ......................... 277/190 X
3,076,668  2/1963   Famely ....................... 248/56 X
3,091,795  6/1963   Budwig ....................... 16/2
4,081,879  4/1978   Rubright ..................... 16/2
4,480,843  11/1984  Springer et al. .............. 277/193 X

FOREIGN PATENT DOCUMENTS

1166567  3/1964   Fed. Rep. of Germany ... 174/153 G
2317752  10/1974  Fed. Rep. of Germany ... 174/152 G Primary Examiner—Laramie E. Askin
Attorney, Agent, or Firm—Karl F. Ross; Herbert Dubno

[57] ABSTRACT

A feedthrough for a conductor in a wall opening which may be subjected to fire comprises to elastomeric parts including a hard part fitted into a soft part and together defining a conductor passage. The soft part presses against the wall opening. The hard part which consists of an elastomeric material contains a large amount of fire-retardant additive. The hard part also may have spaces receiving a fire-retardant substance which communicates by ducts along the joint surfaces of the two parts with the conductor passage.

15 Claims, 6 Drawing Figures

SEALING BODY FOR FEEDTHROUGH FOR AT LEAST ONE CONDUCTING MEMBER THROUGH A WALL OPENING

CROSS REFERENCE TO RELATED APPLICATIONS

This application is a National Phase application of PCT/DE No. 85/00093 filed Mar. 28, 1985 and based under the International Convention on German National application No. P 34 12 400.4 filed Apr. 3, 1984.

FIELD OF THE INVENTION

The invention relates to a sealing body for a feedthrough for at least one conducting member, particularly an electrical cable, traversing a wall opening, whereby an elastic sealing body fills at least partially a clearance between the conducting member and the wall of the opening, creates a receiving space for the conductor corresponding to the cross section thereof and, due to compression into the wall opening, also creates a seal against tne conductor and against the wall of the opening.

BACKGROUND OF THE INVENTION

Known feedthroughs and sealing bodies of this kind function to provide a fire-protecting seal whereby a path for the conductor, separated into fire-resistant segments by the wall, are sealed with respect to one another in a fire-resistant manner. In addition to maxium fire retardation, the feedthroughs and the sealing bodies should have the best possible sealing properties against water, gas and smoke. The known sealing bodies are made of synthetic rubber, such as neoprene or chloroprene, to which, for the desired fire-resistance duration, fire retardant and expanding materials and the like are added. The admixture of these substances to the rubber composition, however, reduces considerably the technical value of the rubber mixture. For example, hardening occurs in the rubber with the addition of relatively small quantities of additives. When the quantity of the additives corresponds to the desired duration of fire-retardant properties, the rubber body can be hardened so much that it may have insufficient elasticity and cannot provide a satisfactory seal against water, gas or smoke. It is also necessary to provide an elastic rubber which is as soft as possible so that the sealing body will adhere snugly to the conductor and the wall of the opening when pressed into the opening. Besides, these rubber mixtures with such additives are expensive, since the admixing process is quite involved. This, in turn, leads to the high cost of such special rubber mixtures. Finally, such sealing bodies, which usually are dimensioned to be quite thick, require extended vulcanization times, so that the forms in which the sealing bodies are vulcanized remain occupied for long times, thereby also contributing to production costs.

OBJECT OF THE INVENTION

The object of the invention is to provide a sealing body for the purposes described which requires the smallest possible quantity of special rubber mixtures with fire-resistant additives for its production ad which does not lose its sealing properties even when the quantity of the admixed additives is quite high.

SUMMARY OF THE INVENTION

This object of the invention is achieved with a sealing body consisting of two separate parts, each extending essentially transverse to the axis of the opening and which are form-locked together at their junction face. One of these parts is made of an elastic and soft rubber (without the stiffening additives or with very little of the flame-resistant additives) and is formed with the sealing surface pressing against the wall of the opening. The other part is made of a harder rubber from the point of view of elasticity with a larger amount of the flame-resistant additives and engages in a recess of the soft, elastic part, pressing axially against the recess, as well as radially in the circumference of an annular shoulder defining the recess externally. In a preferred embodiment, both parts are made of chloroprene rubber, whereby the soft elastic part has a Shore hardness of a maximum of 55 and the elastically harder or stiffer part has a Shore hardness of at least 60. In addition, the arrangement provides that the elastically harder sealing portion is the part of the sealing body facing the outer surface of the wall, while the elastically softer portion is located within the wall opening. In the case of a conically shaped sealing body this means that the elastically harder sealing portion is located at the part of the sealing body larger in diametr, while the sealing body is pressed into the wall opening in the direction of the tapering of the cone.

Due to this invention, it becomes possible to use the very expensive special rubber mixtures only for one portion of the sealing body, namely the elastically harder portion, while the other segment presenting the actual sealing surface and affording sufficient axial lenth to incorporate the conductor consists of a substantially less expensive rubber mixture which is elastically so soft that it ensures a perfect seal against the conductor on one hand and against the opening on the other, when the sealing body is pressed into the wall opening. This elastically softer portion of the sealing body is therefore primarily responsible for the sealing against gas, smoke or water of the feedthrough. By contrast, the elastically harder segment primarily determines the fire resistance and the duration of fire retardation. This segment, which does not have to provide the actual seal, can therefore be hard from the elastic point of view and enriched correspondingly with additives to ensure the desired duration of flame-retardation. At the same time, this elastially harder segment fulfills the function of mechanically stabilizing the elastically softer segment, which is seated on the mechanically stable, elastically harder segment in a cap-like manner. The thickness of this harder segment is to be established not only considering the stability requirements but also the desired duration of flame-retardation. In case of a fire, the elastically harder portion will burn in time. This part therefore need be only as thick as is required to ensure that it will survive through the limit of its fire-retardation duration.

A thickness of the elastically harder segment extending over this limit is pointless from the view of fire protection and would only unnecessarily increase the production cost of this segment due to the incresed quantity of expensive rubber mixtures.

On the other hand, the elastically softer portion of the sealing body lying within the wall opening has the advantage that the cracks in the cable sheathing normally appearing in the case of fire at the point where the cable exits the sealing body, where electrical cables constitute the conductor element, can be delayed, if not totally avoided. These cracks in the cable sheathing are due to the ract that the cable tends to expand because of the heating of the metallic cable core and conventional sealing bodies which are elastically hard even in the exiting points of the cable cannot sufficiently accommodate the resulting inner pressures and having a shearing effect on the cable sheathing.

The sealing body according to the invention, with its elastically softer structure at the exit point of the cable, can elastically accommodate the rising inner pressure of the cable in the area of the cable path outlet, adjusting to the expansion of the cable, so that drastic shearing effects on the cable can be avoided.

Another advantage of the sealing body according to the invention, especially concerning its production, is that both parts can be vulcanized separately and due to their reduced thickness require less vulcanization time than a one-piece and correspondingly thicker sealing body.

The duration of the fire-resistance of the sealing body according to the invention can also be considerably improved by providing hollow spaces filled with fire-resistant substances in the elastically harder segment of the sealing body, and which are in contact with the condutor path via channels running along the joint face. The fire-resistant substances are introduced into the hollow spaces after the elastically harder portion has been vulcanized and completely finished in order to preclude premature thermal decomposition of these fire-resistant substances during vulcanization. In this manner, the quantity of fire-resistant substances in the feedthrough can be considerably increased, since it is limited only by the size of the hollow spaces in which the are received.

In addition, the arrangement and shape of these hollow spaces can place the flame-resistant substances in predetermined high proportions of the areas most critical in the case of fire, and deliver them through the channels directly to the path of the conductor under heavy thermal load. Considering the possible quantity of flame-resistant substances to be used, the hollow spaces can be increased by extending the annular collar of the elastically harder segment into the elastically softer segment and by providing the ofter segment with recesses for receiving the annular collars. In these annular collars the opening connecting the hollow spaces with the channels can be located.

Furthermore, it has been found to be advantageous to have the channels end in an nnular groove surrounding the conductor path. Closed axial grooves can also extend along the circumferential surface of the conductor path in the elastically harder segment of the sealing body from the annular groove. Through these channels, annular grooves and axial grooves, in the case of fire, the fire-extinguishing and fire-retardant decomposition gases produced by the fire-resistant substances are released by the heat and distributed over the circumference of the conductor and the length of the conductor path and thus become effective immediately at the conductor.

SPECIFIC DESCRIPTION

Figure 1:
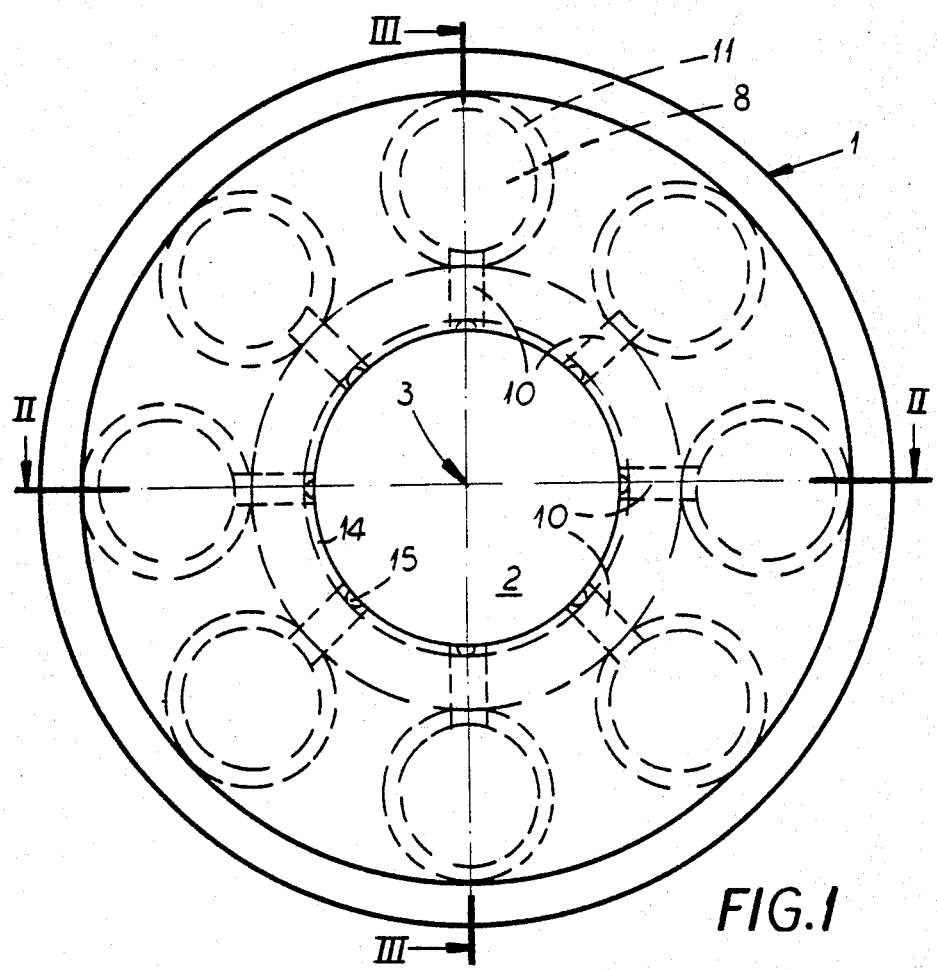
FIG. 1 is an end view of the sealing body according to the invention.

The sealing body 1 forms a feedthrough for electrical conductors or cables (not shown in the drawing) through a wall opening (not shown), whereby the sealing body 1 fills the space between the conductors or cables and the wall defining the opening.

Figure 2:
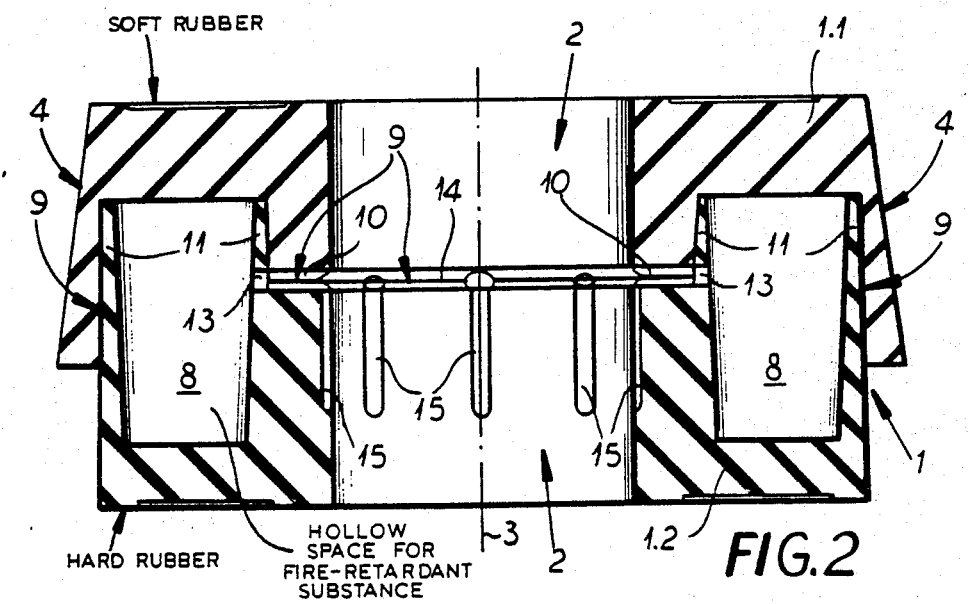
FIG. 2 is a section long the line II—II through the sealing body of FIG. 1.
Figure 3:
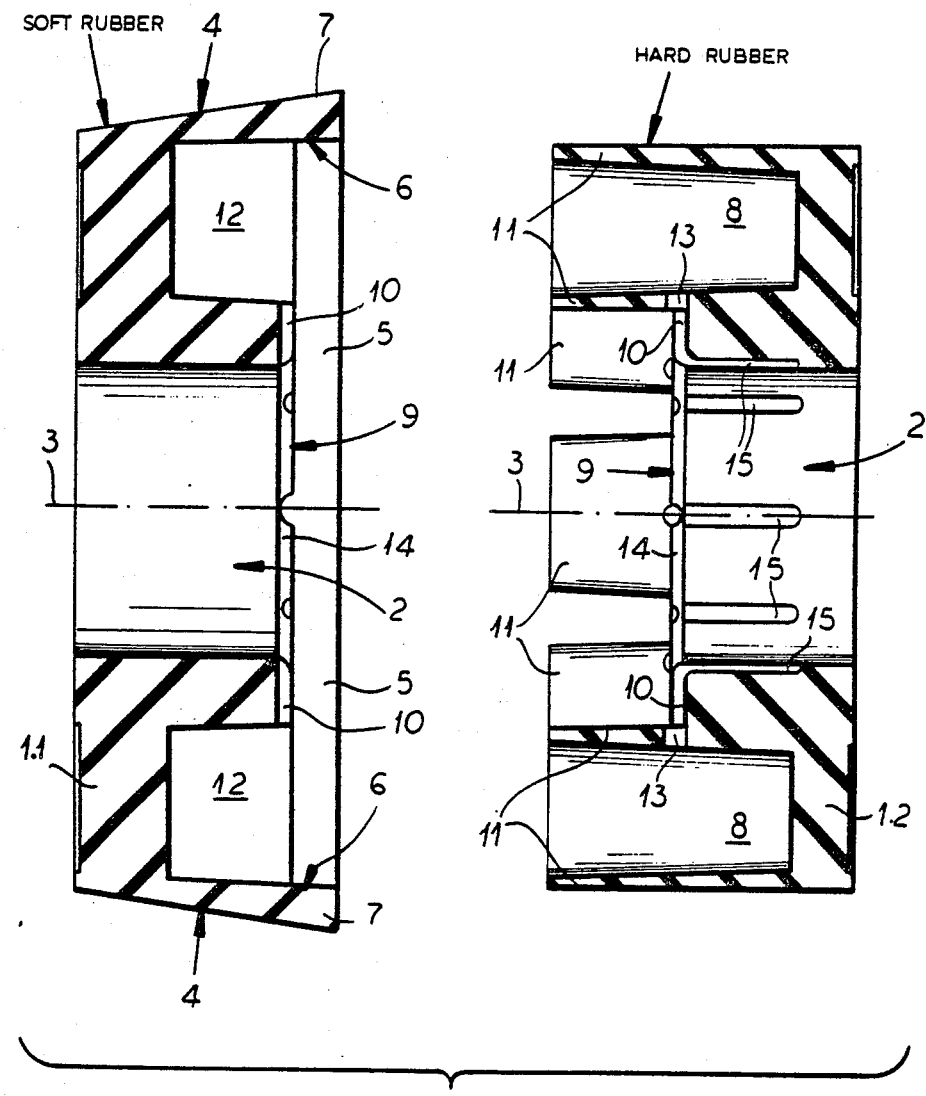
FIG. 3 is a section along the line III—III through the sealing body according to FIG. 1, with the two segments separated from each other.
Figure 4:
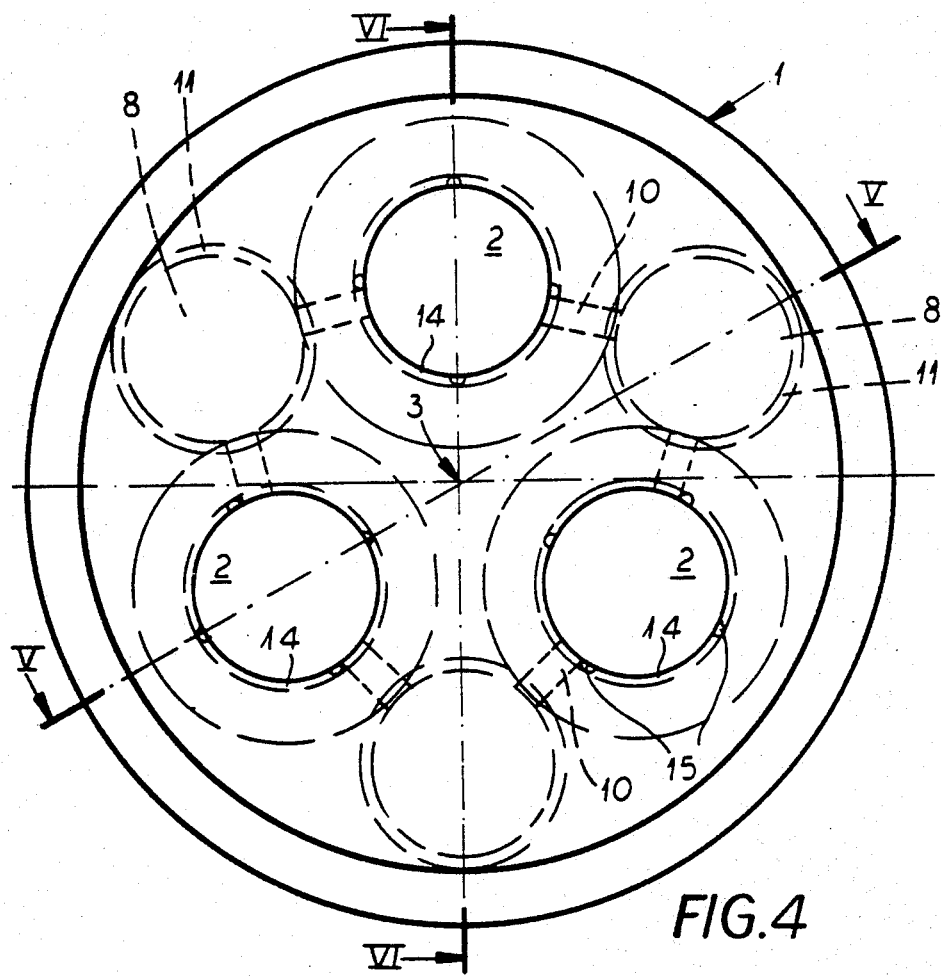
FIG. 4 is an end view of another embodiment of the sealing body according to the invention.
Figure 5:
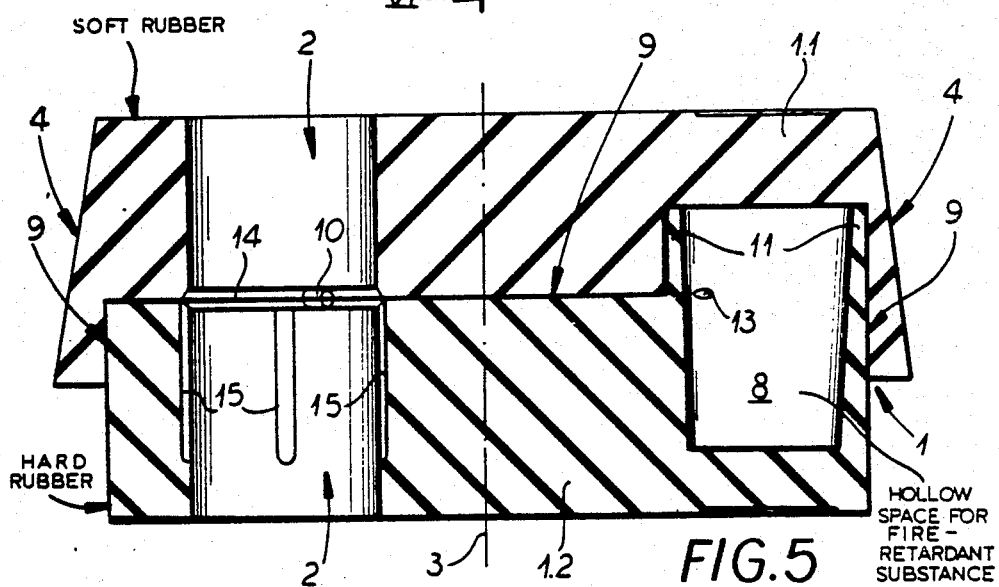
FIG. 5 is a section along line V—V through the sealing body of FIG. 4.
Figure 6:
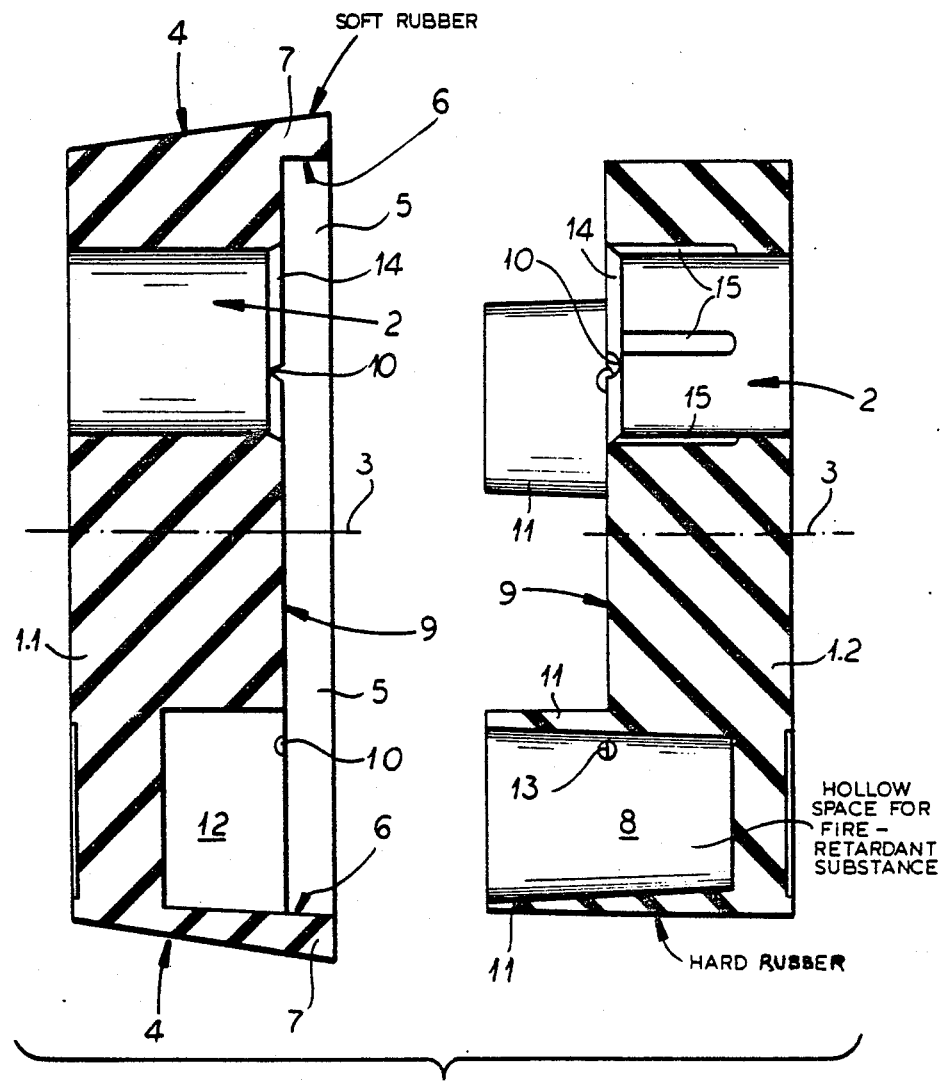
FIG. 6 is a section along the line VI—VI through the sealing body of FIG. 4 with separated segments as in FIG. 3.

In the embodiment shown in FIGS. 1 to 3, the sealing body 1 has only one conductor passage 2 for a single conductor. In the embodiment of FIGS. 4 to 6 three conductor passages 2 are shown.

These conductor passages 2 are adjusted to fit the respective cross section of each conductor, so that the sealing body 1 when pressed into the call opening provides an elastic seal against each conductor on the one hand and, on the other hand, against the wall of the opening.

In all shown embodiments, the sealing body 1 consists of two segments 1.1 and 1.2, each of which is essentially transverse to the axis of the wall opening which corresponds to an axis 3 of the sealing body 1. The segments 1.1 and 1.2 are formed separately from each orher (FIG. 3) and are form-locked together at their joint surface 9 (FIG. 2).

One of the segments 1.1 is made of an elastically soft rubber with no or very little additives and thus is inexpensive. The segment 1.1 carries the sealing surface 4 which can be pressed against the wall of the opening.

The other segment 1.2 is made of an elastically harder rubber because of the addition of flame-resistant substances and the like to the rubber composition and fits into a recess 5 of the elastically softer part 1.1, being resiliently pressed against the bottom of the recess axially. The segment 1.2 bears radially against the cirumferential area of an annular shoulder 6 externally defining the recess 5.

The annular rim of the elastically harder segment 1.2 which bears on the shoulder 6 thus mechanically stabilizes the elastically softer segment 1.1 and particularly prevents the ring portion or apron 7 remaining between the annular shoulder 6 and the sealing surface 4 from being deflected radially inwardly in the area of the annular shoulder 6, when the body is pressed into the wall opening.

At the same time, the elastically harder portion 1.2 absorbs mechanically the pressure differences existing in the axial direction along the feedthrough, so that the elastically soft portion 1.1 cannot be deformed as a result of these pressure differences. In conclusion, the elastically softer segment 1.1 fulfills the sealing functions against the conductors on one hand and the wall of the opening on the other, while the elastically harder segment 1.2 fulfills the functions of mechanical stabilization and fire protection or fire propagation retardation.

Both sealing body segments 1.1, 1.2 can be made of chloroprene rubber. The elastcally softer segment 1.1 should have a Shore hardness lower than 55 and the elastically harder segment a Shore hardness of more than 60. Since the elastically harder segment 1.2 due to it content of fire-resistant additives has the function of fire-protection and fire-retardation, it is located at the part of the sealing body facing the wall exterior, which in the case of fire faces the flame. The elastically softer segment 1.1 is located within the wall opening. In the embodiment of the sealing body 1 shown in the drawing with a conically tapered sealing surface 4, the elastically harder segment of he sealing body 1.2 is located at the side of the sealing body 1 having the larger diameter.

Hollow spaces 8, which can be filled with flame-retardants, are connected to the conductor passages 2 via channels or grooves 10 running along the joint surface 9. The hollow spaces 8 are enlarged (extended) by the annular collars 11 of the elastically harder egment 1.2. These collars 11 extend into recesses 12 in the elastically softer segment 1.1. In order to connect the hollow spaces 8 and the ducts 10, openings 13 are provided in the annular collars 11. The ducts 10 end in annular grooves 14 surrounding the respective conductor passages 2. Axial groooves 15 formed in the circumferential surface of the conductor passages 2 of the elastically harder sealing body segment 1.2 are connected to the grooves 14 so that in the case of fire, the gases generated by the decomposition of the flame-retardants in the spaces 8 can flow into the conductor passages 2 and can be distributed all over the circumference of the conductor passages.

I claim:

1. A fire-retardant feedthrough for a conductor transversing an opening in a wall, said feedthrough comprising a sealing body having an axis and formed with a conductor passage extending axially therethrough for receiving a conductor, said sealing body being constituted from a soft elastic part composed of an elastomer containing at most a limited proportion of flame retardant additives and a stiff part composed of an elastomer containing a substantial proportion of flame retardant additives and of a hardness greater than that of said soft part, said soft and hard parts axially adjoining one another and each lying generally transverse to said axis, said soft part being formed with:
a recess axially opening toward said hard part and surrounded by an elastic annular apron defining an outer wall of said body,
an axial passage portion adapted to hug a conductor and extending away from said hard part and communicating with said recess, and
a joint surface inwardly of said apron between said axial passage portion and said recess and extending generally transverse to said axis; and said hard part being fitted into said soft part and being formed with:
a joint surface extending generally transverse to said axis and adapted to abut said joint surface of said soft part,
an annular rim received in said recess for pressing said apron outwardly into engagement with a wall of an opening, and
an axial passage portion adapted to surround a conductor and extending away from said soft part and terminating at said joint surface of said hard part and aligned with said axial passage portion of said soft part to complete therewith said conductor passage in said body.

2. The fire-retardant feedthrough defined in claim 1 wherein the elastomer of each of said parts comprises a chloroprene rubber and said soft part has a Shore hardness of a maximum of 55 and said hard part has a Shore hardness of at least 60.

3. The fire-retardant feedthrough defined in claim 1 wherein said outer wall of said body conically tapers from a large diameter side toward a small diameter side thereof, said hard part being provided at said large diameter side.

4. A fire-retardant feedthrough for a conductor traversing an opening in a wall, said feeothrough comprising a sealing body having an axis and formed with a conductor passage extending axially therethrough for receiving a conductor, said sealing body being constituted from a soft elastic part composed of an elastomer containing at most a limited proportion of flame retardant additives and a stiff part composed of an elastomer containing a substantial proportion of flame retardant additives and of a hardness greater than that of said soft part, said soft and hard parts axially adjoining one another and each lying generally transverse to said axis, said soft part being formed with:
a recess axially opening toward said hard part and surrounded by an elastic annular apron defining an outer wall of said body,
an axial passage portion adapted to hug a conductor and extending away from said hard part and communicating with said recess, and
a joint surface inwardly of said apron between said axial passage portion and said recess and extending generally transverse to said axis; and said hard part being fitted into said soft part and being formed with:
a joint surface extending generally transverse to said axis and adapted to abut said joint surface of said soft part to form a joint between said parts, said joint being formed with ducts communicating with said conductor passage,
an annular rim received in said recess for pressing said apron outwardly into engagement with a wall of an opening,
hollow spaces filled with a flame-retardant substance releasing flame retardant upon heating, said ducts communicating with said spaces, and
an axial passage portion adapted to surround said conductor and extending away from said soft part and terminating at said joint surface of said hard part and aligned with said axial passage portion of said soft part to complete therewith said conductor passage in said body.

5. The fire-retardant feedthrough defined in claim 4 wherein said hard part is formed with annular collars axially extending each of said spaces, said soft part being provided with respective cavities receiving said annular collars.

6. The fire-retardant feedthrough derined in claim 5 further comprising holes formed in said collars for communicating between said ducts and said spaces.

7. The fire-retardant feedthrough defined in claim 4 wherein said ducts include:
first grooves in at least one of said joint surfaces connected to said spaces,
an annular groove in one of said joint surfaces at which one of said first grooves terminates, and
axially extening grooves formed in said axial passage portion of said hard part and communicating with said annular grooves.

8. In combination, a fire-retardant feedthrough and a conductor traversing an opening in a wall, said feedthrough comprising a sealing body having an axis, received in said opening and formed with a conductor passage receiving said conductor and extending axially through said body, said sealing body being constituted from a soft elastic part composed of an elastomer containing at most a limited proportion of flame retardant additives and a stiff art composed of an elastomer containing a substantial proportion of flame retardant additives and of a hardness greater than that of said soft part, said soft and hard parts axially adjoining one another and each lying generally transverse to said axis, said soft part being formed with:
a recess axially opening toward said hard part and surrounded by an elastic annular apron defining an outer wall of said body,
an axial passage portion adapted to hug said conductor and extending away from said hard part and communicating with said recess, and
a joint surface inwardly of said apron between said axial passage portion and said recess and extending generally transverse to said axis; and
said hard part being fitted into said soft part and being formed with:
a joint surface extending generally transverse to said axis and adapted to abut said joint surface of said soft part,
an annular rim received in said recess and pressing said apron outwardly into engagement with a wall of said opening, and
an axial passage portion surrounding said conductor and extending away from said soft part and terminating at said joint surface of said hard part and aligned with said axial passage portion of said soft part to complete therewith said conductor passage in said body.

9. The fire-retardant feedthrough defined in claim 8 wherein the elastomer of each of said parts comprises a chloroprene rubber and said soft part has a Shore hardness of a maximum of 55 and said hard part has a Shore hardness of at least 60.

10. The fire-retardant feedthrough defined in claim 8 wherein one side of said wall provided with said opening is potentially subjected to fire, said body being provided in said opening with said hard part turned toward said side of said wall.

11. The fire-retardant feedthrough defined in claim 8 wherein said outer wall of said body conially tapers from a large diameter side toward a small diameter side thereof, said hard part being provided at said large diameter side.

12. In combination, a fire-retardant feedthrough and a conductor traversing an opening in a wall, said feedthrough comprising a sealing body having an axis, received in said opening and formed with a conductor passage receiving said conductor and extending axially through said body, said sealing body being constituted from a soft elastic part composed of an elastomer containing at most a limited proportion of flame retardant additives and a stiff part composed of an elastomer containing a substantial proportion of flame retardant additives and of a hardness greater than that of said soft part, said soft and hard parts axially adjoining one another and each lying generally transverse to said axis, said soft part being formed with
a recess axially opening toward said hard part and surrounded by an elastic annular apron defining an outer wall of said body,
an axial passage portion adapted to hug said conductor and extending away from said hard part and communicating with said recess, and
a joint surface inwardly of said apron between said axial passage portion and said recess and extending generally transverse to said axis; and
said hard part being fitted into said soft part and being formed with:
a joint surface extending generally transverse to said axis and adapted to abut said joint surface of said soft part, to form a joint between said parts, said joint being formed with ducts communicating with said conductor passage,
an annular rim received in said recess and pressing said apron outwardly into engagement with a wall of said opening,
hollow spaces filled with a flame-retardant substance releasing flame retardant upon heating, said ducts communicating with said spaces, and
an axial passage portion surrounding said conductor and extending away from said soft part and terminating at said joint surface of said hard part and aligned with said axial passage portion of said soft part to complete therewith said conductor passage in said body.

13. The fire-retardant feedthrough defined in claim 12 wherein said hard part is formed with annular collars axially extending each of said spaces, said soft art being provided with respective cavities receiving said annular collars.

14. The fire-retardant feedthrough defined in claim 13 further comprising holes formed in said collars for communicating between said ducts and said spaces.

15. The fire-retardant feedthrough defined in claim 12 wherein said ducts include:
first grooves in at least one of said joint surfaces connected to said spaces,
an annular groove in one of said joint surfaces at which one of said first grooves terminates, and
axially extending grooves formed in said axial passage portion of said hard part and communicating with said annular grooves.

* * * * *